Patented May 16, 1933

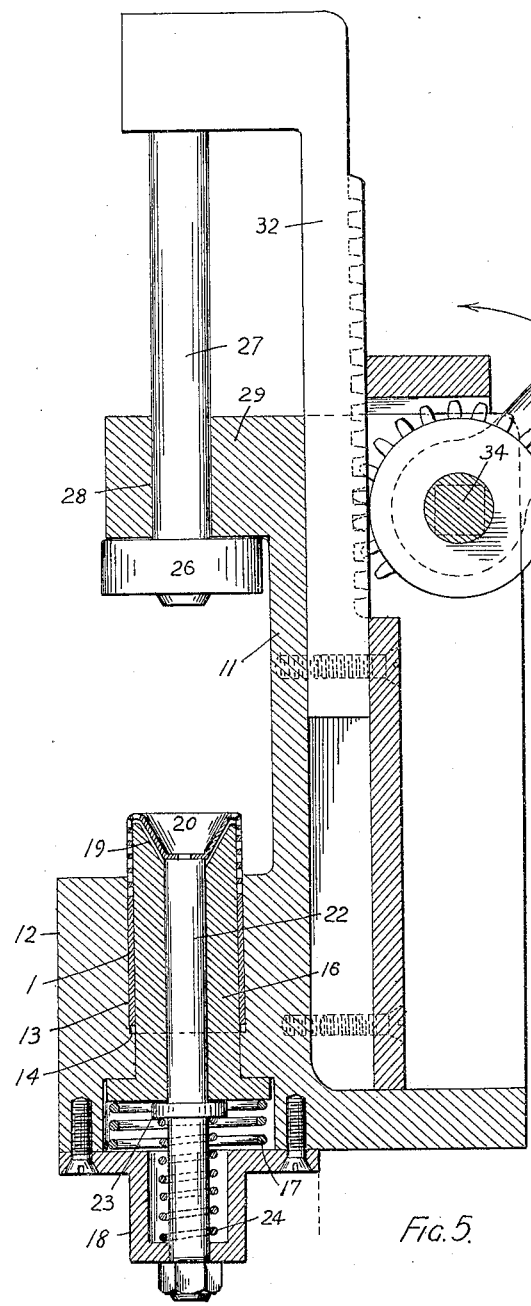
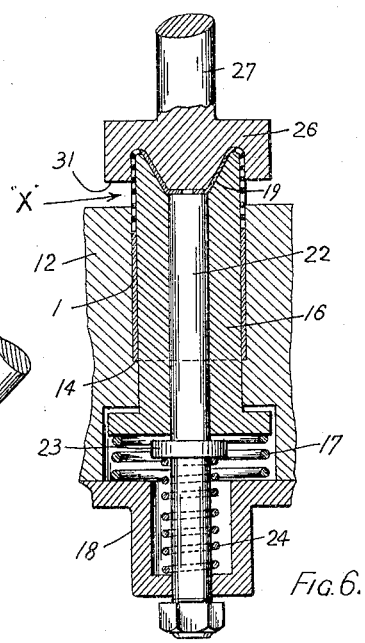
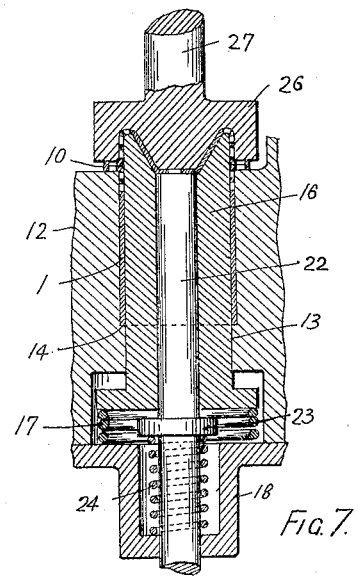

1,909,515

UNITED STATES PATENT OFFICE

JAMES SELDON BAKER, OF SYDNEY, NEW SOUTH WALES, AND HERBERT FREDERICK CUNNINGTON, OF OAKLEIGH, MELBOURNE, VICTORIA, AUSTRALIA, ASSIGNORS TO THE MANTLE LAMP COMPANY OF AMERICA, OF CHICAGO, ILLINOIS, A CORPORATION OF ILLINOIS

FLAME SPREADER FOR MANTLE OIL LAMPS

Application filed September 14, 1931, Serial No. 562,672, and in Australia October 9, 1930.

This invention relates to flame-spreaders for mantle oil lamps, such lamps being provided with a burner of the blue-flame wick type. The object of the invention is to provide means in association with the flame-spreader whereby the latter can, if required, be locked to the tube of the burner of the lamp, and also to provide means associated with the perforated portion of the flame-spreader whereby upward movement of the lamp wick is controlled.

In lamps to which the invention relates the tube of the burner is provided interiorly thereof with three spaced projections, the latter being adapted to serve as seatings for flame spreaders at present known when such spreaders are assembled within the said tubes. According to this invention such projections are still retained, but the flame-spreaders are furnished with suitable cuts therein or the said spreaders may have connected thereto means with suitable cuts therein, the said cuts being adapted to allow entry of the said projections thereinto and when the spreader is turned within the burner tube to permit the spreader to become lock-engaged with the said projections on the said tube, in a manner similar to a bayonet-joint. Any suitable number of projections and cuts may be provided.

Further, at a suitable distance from the head of the spreader and in relation to the perforations therein, the spreader is furnished with a flange, ring, or other suitable stop means, the object of same being to serve as a stop for controlling upward raising of the wick of the lamp in relation to the perforations in the spreader. Any preferred number of rows of perforations may be provided in the spreader above and below the said stop.

If the ring or flange is to be provided in association with the spreader, it may be furnished by suitably expanding the metal of the spreader outwardly to form the ring or flange, or an appropriate ring can be secured to the spreader.

Figure 1:
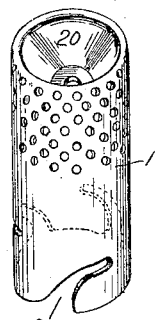
Figure 2:
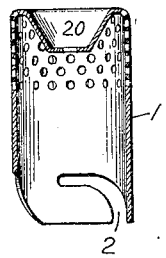
Figure 3:
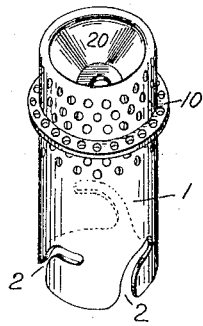
Figure 4:
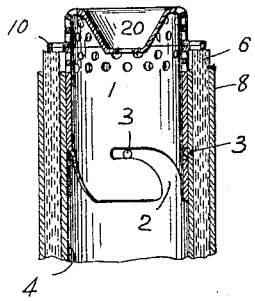

Referring to the accompanying drawings, Fig. 1 is a perspective view of a flame spreader of ordinary construction with the addition of slotted securing grooves; Fig. 2 is a central sectional elevation thereof; Fig. 3 is a perspective view of a flame spreader with a flange formed thereon; Fig. 4 is a central sectional elevation through the burner tube with a flame spreader in position therein; and Figs. 5, 6 and 7 are detail sectional elevations of one form of the apparatus for forming a ring flange on the spreader.

With reference to Figs. 1 and 2, the flame spreader 1 is of usual construction with a plurality of additional slotted grooves 2 adapted to engage with the projections 3 (see Fig. 4) on the burner tube 4. Such tube 4 is surrounded by the tubular wick 6 enclosed by the outer tubular casing 8.

Referring to Fig. 3 wherein is shown a flame spreader 1 which is provided with a flange 10 formed integrally therewith, such flame spreader 1 is constructed as shown in Fig. 1; but to provide the flange 10 thereon, the said spreader 1 is subjected to treatment in a suitable flange forming apparatus 11 one design of which being depicted in Figs. 5, 6 and 7. Before the flame spreader 1 is placed in association with the said flange forming apparatus the portion thereof which is to be furnished with the flange 10 may be made pliable by annealing or otherwise. Such flange 10 is positioned between any preferred number of rows of perforations in the flame spreader 1, that is to say, between rows of perforations above and below the said flange.

The apparatus 11 consists of an anvil block 12 which has a tubular through opening 13 into which the flame spreader 1, as shown in Fig. 1, is placed to engage with the shoulder 14 contained in such tubular opening 13.

Slidably positioned within the narrower portion of the tubular opening 13 is a plunger 16 which is resiliently mounted upon the compressible coil spring 17; said spring 17 rests upon the cap 18 which is rigidly secured to the anvil block 12.

At its upper end the plunger 16 has a conical recess 19 into which neatly fits the conical head 20 of the flame spreader 1. (See Fig. 5). Centrally of the plunger 16 is a second plunger 22 which has a collar 23; a compressible coil spring 24 is positioned between collar 23 and the cap 18 and such spring surrounds the lower portion of the plunger 22.

Apparatus 11 is also provided with a drop block 26 which is mounted on a slidable rod 27 carried in a bearing 28 in the head 29 of the apparatus 11. Said drop block 26 and rod 27 may be actuated in any appropriate manner. The rod 27 is affixed to a tooth rack plunger 32 which is slidably mounted on the apparatus 11. Such tooth rack 32 is actuated by the toothed pinion 33 which is affixed to the axle 34 on which is rigidly affixed a manually operable lever 35. The under face 31 of the drop block 26 is recessed according to the contour of the upper end of the flame spreader 1 which is furnished with the conical recess 20.

In operation, to form an integral perforated flange 10 on the flame spreader 1, a flame spreader 1 is placed over the plunger 16 whereby the conical head 20 of the spreader 1 will be positioned in the conical recess 19 of the plunger 16 and will rest upon the top end of the second plunger 22 (see Fig. 5). On operating the drop block 26 downwardly by operating lever 35 such block will engage with the conical head 20 of the flame spreader 1 firmly pressing the conical head 20 of the spreader 1 into the conical recess 19 of the plunger 16; the spreader 1 will thus be firmly gripped between both plunger rods 16 and 22 and the drop block 26. On further depression of the drop block 26 the lower end of the spreader 1 is made to abut the shoulder 14 of the opening 13 in the anvil block 12 thus leaving a space "X" between the under face of the drop block 26 and the anvil block 12 (see Fig. 6) within which the flange 10 can be formed. By further depression of the drop block 26 (see Fig. 7) a perforated flange 10 is formed integrally with the spreader 1. It is preferable to form the bends of the flange 10 on the horizontal annular spaces between the rows of perforations of the spreader 1, so that when the flange 10 is formed on the spreader 1 it will be formed with the perforations therein in a vertical position.

With reference to Fig. 4, in such figure is shown a flame spreader 1 positioned in the lamp burner tube 4 and locked in position therein through the projections 3 on the tube 4 engaging in the grooves 2 of the spreader 1. When the wick is raised and abuts the flange 10 of the spreader 1, the latter will be prevented from lifting through engagement of the projections 3 in the grooves 2.

It will be understood that the flame spreader 1 with the flange 10 thereon may be furnished with the grooves 2 or it may be made as ordinarily to engage with the projections 3.

By providing means such as those described herein for locking the spreader 1 to the burner tube 4 it is ensured that when the wick is being raised the spreader 1 will not be likely to be raised therewith and thus permit of the flame of the lamp being distorted. Again, the provision of the stop means 10 on the perforated portion of the spreader 1 ensures that the wick can only be raised to a certain extent and not beyond its normal burning point, or the position where the mantle will be fully incandesced when the burner parts are adequately heated; excessive flame is thus prevented from coming into contact with the mantle whereby carbon would be deposited thereon and the openings in the mantle closed and heat thrown downwardly to cause overheating of the burner.

What we claim as our invention and desire to secure by Letters Patent is:—

1. A flame spreader for a burner of the blue-flame wick type, having perforations in its wall, and an outwardly-extending wick stop consisting of an expanded part of said wall that is disposed between perforations thereof.

2. A flame spreader for a burner of the blue-flame wick type having perforations in its wall, and an outwardly-extending and perforated wick stop consisting of an expanded part of said wall that is disposed between perforations thereof.

In testimony whereof we affix our signatures.

JAMES SELDON BAKER.
HERBERT FREDERICK CUNNINGTON.